United States Patent [19]
Chang

[11] 3,864,611
[45] Feb. 4, 1975

[54] SOLID STATE CONTROL CIRCUIT FOR INTERMITTENTLY ENERGIZED LOADS
[75] Inventor: Thomas C. Chang, Irvine, Calif.
[73] Assignee: Corona Controls, Inc., Corona, Calif.
[22] Filed: Oct. 29, 1973
[21] Appl. No.: 410,355

[52] U.S. Cl. ............... 318/484, 62/158, 307/141.4, 317/13 R, 317/141 S
[51] Int. Cl. ............................................. H02h 3/08
[58] Field of Search ............. 307/141.4, 141, 141.8; 318/484, 221 C, 471, 472; 62/158; 317/13 R, 141 S

[56] References Cited
UNITED STATES PATENTS

| | | | |
|---|---|---|---|
| 3,619,668 | 11/1971 | Pinckaers | 307/141 X |
| 3,688,130 | 8/1972 | Granieri | 317/141 S |
| 3,700,914 | 10/1972 | Graneiri et al. | 307/141 |
| 3,721,880 | 3/1973 | Neill | 318/471 |
| 3,777,240 | 12/1973 | Neill | 62/158 X |

Primary Examiner—B. Dobeck
Attorney, Agent, or Firm—Miketta, Glenny, Poms & Smith

[57] ABSTRACT

For intermittently energized electrical loads, such as an electrical compressor motor in an air conditioning system responsive to a temperature sensitive thermostat switch, a circuit of solid state devices is provided for selectively introducing a time delay in the control system. In the case of an air conditioning system, the solid state control circuit is connected in combination with the temperature sensitive switch for energizing the compressor motor only at selected times. When the system is initially turned on and the compressor motor is operating under low pressure conditions, the solid state control circuit provides for immediate energization of the compressor motor in response to the closure of the thermostat switch. However, after a period of operation of the compressor motor and under conditions of relatively high pressure and heavy motor loading, rapid cycling, that is rapid opening and closing of the thermostat switch, does not result in immediate re-energization of the compressor motor. Rather, the solid state control circuit introduces an interval of time delay to allow the compression system to return to a lower pressure, low load condition before the compressor motor is re-energized. To provide this selective time delay, the solid state control circuit is phase sensitive to an alternating current voltage intermittently available too energize the compressor motor or other electrical load.

10 Claims, 4 Drawing Figures

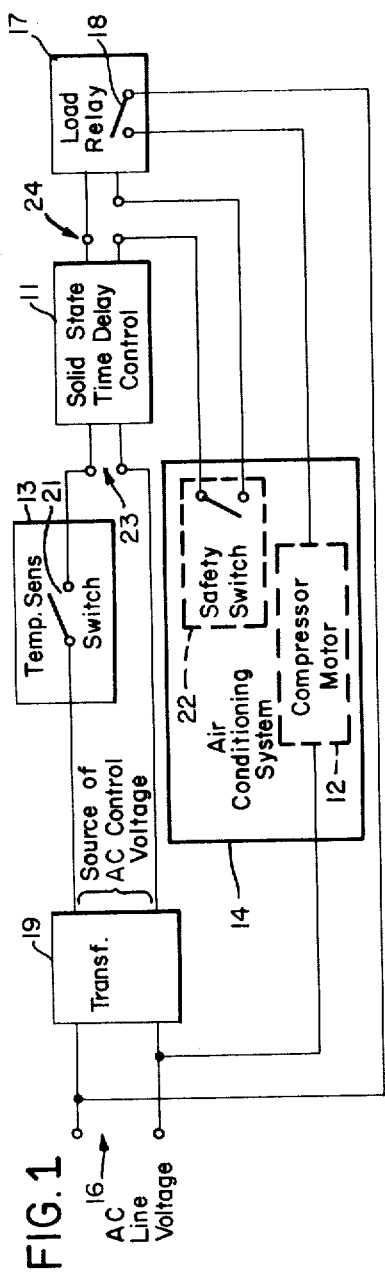
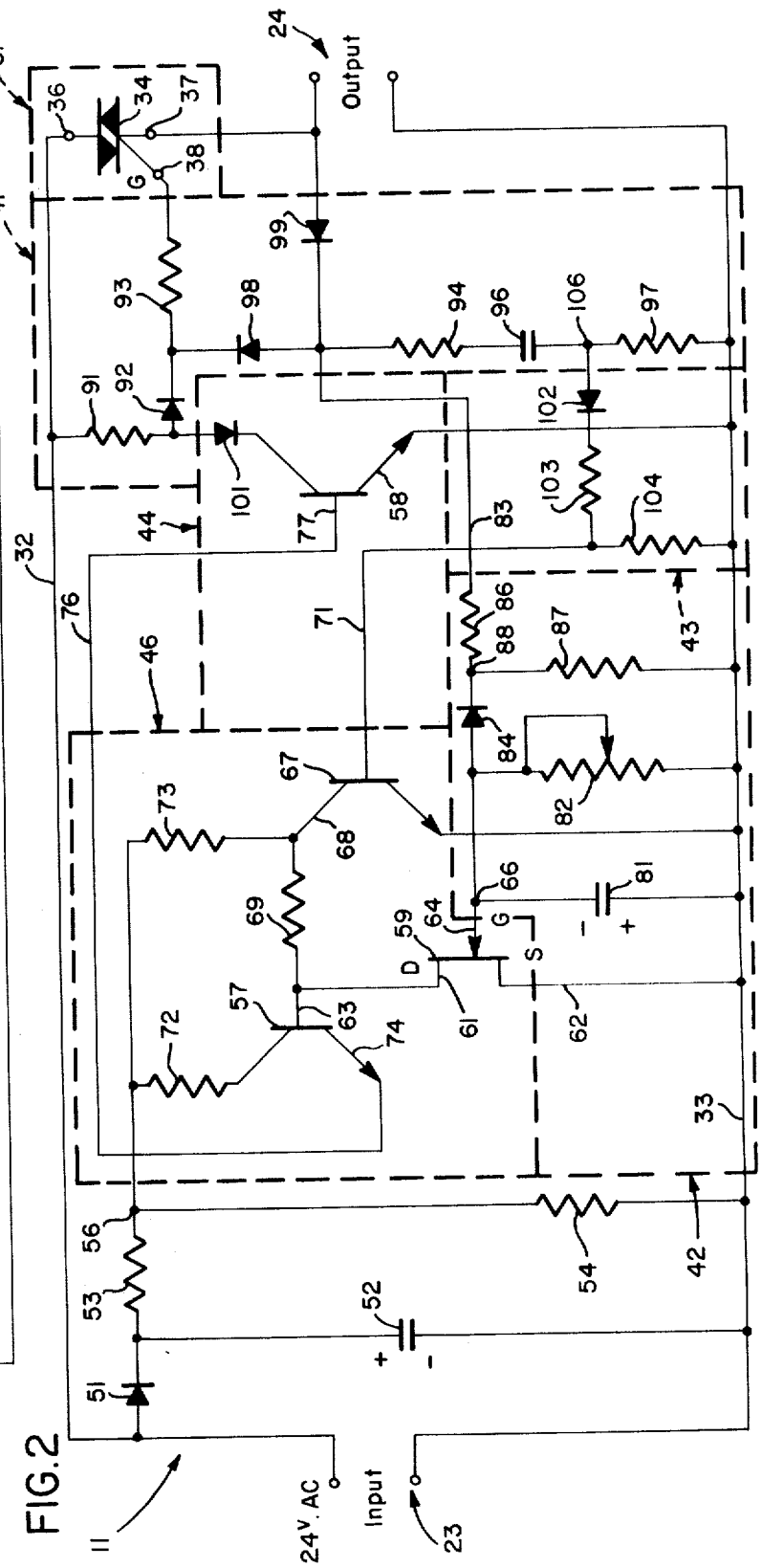

SOLID STATE CONTROL CIRCUIT FOR INTERMITTENTLY ENERGIZED LOADS

BACKGROUND OF THE INVENTION

In general the present invention relates to control circuits, and more particularly to a circuit useful in control systems for intermittently operating an electrical load in response to an intermittently available alternating current voltage.

Although the solid state circuit disclosed herein has general utility in control systems, it has been found particularly advantageous for operating compressor motors. Motor driven compressor systems are useful in various applications. For example, compressors are used in hydraulic systems, pneumatic systems, refrigeration systems and air conditioning systems.

In these environments, the compressor is typically driven by an electrical motor which is intermittently turned on and off as compression is needed by the system. For example, in the case of an air conditioning system when the temperature in the controlled room or building reaches a predetermined level, a temperature sensitive switch, i.e., a thermostat, responsively turns on the conditioning system. This energizes an electrical motor which in turn drives a compressor for compressing the refrigerant or cooling fluid as the first step in the cooling cycle. Subsequently, the steps of condensing, expanding and evaporating the fluid serves to produce the cooling air for the system.

One of the difficulties in operating compressor systems of the foregoing type lies in the different operating conditions under which the compressor motor may be energized. For an air conditioning system which has been off for an extended period of time, the initial demand on the compressor, its electrical drive motor and the line voltage are slight. That is, the system is starting up with little or no initial pressure buildup and the compressor and its motor are energized under low load conditions. On the other hand, after the system has been operating for an interval of time, the compressor is operating against a substantial pressure buildup in the system and the steady state load conditions on the compressor and the motor are substantial. If the compressor is in a steady state running condition, the continued operation thereof even under the substantial pressure loads does not unduly strain the system.

When, however, the system has been shut down briefly or the electrical power to the compressor motor has been temporarily interrupted, re-energization of the system under the relatively high pressure, heavy load conditions causes undesirable strain or overloading of compressor motor and the electrical circuits. Startup of the motor under heavy loading tends to rapidly wear out the motor itself and the electrical control devices supplying the motor startup current. This problem is referred to for example in U.S. Pat. No. 3,434,028.

One of the most successful solutions to this operational defect of compressor systems, is to provide a time delay in the system. This serves to delay the re-energization of the compressor motor until after a predetermined interval, allowing the compression system to cool off and the high pressure, heavy load condition to subside. Preferably this delay interval is provided only after the compression system has been operating for an extended period of time. That is, no delay occurs during the initial start-up of the system when the load on the compressor is light.

Although the system disclosed in U.S. Pat. No. 3,434,028 does provide in general the selective time delay for control over the compressor motor, the means for providing the delay has the disadvantages of being too large, bulky, expensive to construct and maintain, and susceptible to malfunctions. Primarily this is because of the electro-mechanical nature of the disclosed delay apparatus wherein motor-driven, cam operated electromechanical switches are employed to meet the special delay needs. Similarly, other timing systems which have employed electromechanical and electrothermal mechanisms to produce the selective delay have been found deficient in one or more respects.

SUMMARY OF THE INVENTION

Accordingly, it is an object of the present invention to provide a selective time delay circuit for operating intermittently energized loads, such as a motor driven compressor, which is characterized by features of small and compact size, capable of being mass manufactured at a low per unit cost, and exceptional reliability.

Another object of the present invention is to provide such a control circuit which uses solid state devices and components exclusively for a long-reliable operating life.

Still another object of the present invention is to provide such a solid state control circuit capable of uniform repeatability of the delay interval, cycle after cycle. That is, under operating conditions which demand a delay before the reenergization of the compressor motor, the duration of the introduced delay will not vary from cycle to cycle because of such influences as temperature effects, line voltage fluctuations, etc.

A further object of the present invention is to provide such a solid state selective delay control circuit in which the delay period may if desired be adjustable by a simple, easily accessible control setting associated with the circuit.

Additionally, it is an object of the present invention to provide such a solid state selective time delay circuit for operating in a control system in which the selective delay is enabled by a brief interruption in either the control voltage, such as from a thermostat switch or in the power or load voltage. That is the circuit in accordance with the present invention is responsive to an interruption of either the control or load circuit to introduce the selective delay upon re-establishing the interrupted circuit.

One further object of the present invention is to provide such a solid state control circuit for use in standardized or existing air conditioning or refrigerator systems in which the circuit can easily replace existing electromechanical or electrothermal delay devices without re-wiring the system. Similarly, it is an object of the present invention to provide such a control circuit which once installed may be easily replaced or serviced.

As indicated above, one application of the solid state selective delay circuit of the present invention is to avoid over-loading of the compressor motor and/or line voltage caused by re-energization of the motor immediately after an extended operating period. Additionally, the selective delay serves to avoid rapid cycling of the compressor motor or other controlled motor which also creates undue strain and wear on the motor and power circuit. Re-energization of the motor after an extended operating period or rapid cycling of the motor can be caused by undesirable characteristics associated with the thermostat switch, such as contact chatter, floating contacts, etc., or by unavoidable brief power interruptions such as associated with regional "brown-outs," interruptions due to electrical storms, breaker interruption due to circuit over-loading, etc..

In general, the selective delay circuit of the present invention is useful in any system where rapid cycling of an intermittently energized load is to be avoided, regardless of the cause of the interruption. For example, the circuit may be employed advantageously to avoid the undesirable effects of rapid re-energizaton of a compressor motor for the reasons given above, or the circuit may be used to avoid contact bounce in an electromechanical switch, such as a relay.

Briefly, the solid state selective delay control circuit in accordance with the embodiment of the invention disclosed herein includes a bi-directional thyristor connected as a solid state switch for selectively applying an alternating current control voltage to the electrical load. The ac voltage itself may be intermittent as in the case of a thermostat control voltage, or may merely be subject to occasional interruption because of power failures or the like. The thyristor includes a control or trigger electrode which in turn is responsive to a trigger circuit means for switching the thyristor to a low impedance "on" state under certain conditions. In a case where the intermittent alternating current control voltage has been off for a period of time, the re-application of the voltage causes the trigger circuit means to immediately switch the thyristor "on," thus energizing the load. To sustain the "on" condition of the bi-directional thyristor, the trigger circuit means is responsive to certain phase conditions of the applied alternating current voltage to continuously trigger the control electrode of the thyristor for sustained bi-directional conduction.

After an extended "on" condition, any momentary or brief interruption of the alternating current control voltage is detected by a sensing circuit means which in turn enables a delay circuit means. The delay circuit means is effective through a logic circuit means to operate a trigger circuit disablement means which in turn selectively disables the trigger circuit means for the predetermined delay interval.

By this arrangement, the trigger circuit means is continuously effective to sustain the conduction of the bi-directional thyristor means only so long as the alternating control voltage is continuously applied. Any momentary interruption or loss of the alternating current voltage after an extended "on" interval causes the delay circuit means to become effective to disable the otherwise re-occurring triggering of the thyristor and thus cause the thyristor to return to its high impedance "off" state. The electrical load, which may for example be the compressor motor of an air conditioning system remains off for the duration of the delay interval. Upon expiration of the delay period, the trigger circuit means is again enabled allowing the applied alternating current control voltage to trigger the thyristor switching means "on."

As indicated, the disablement of the trigger circuit means occurs only after an extended period of energization of the load and lasts only for the interval determined by the delay circuit. All of the components employed in the circuit are solid state or passive element devices for trouble-free extended life operation. Moreover, the circuit is adapted for connection in a conventional control system without requiring modification or re-wiring of the system.

These and further advantages of the solid state selective delay control circuit according to the present invention will become apparent to those skilled in the art from a consideration of the following detailed description and appended drawings of an exemplary embodiment thereof.

BRIEF DESCRIPTION OF THE DRAWINGS

FIG. 1 is a generalized block diagram view of an air conditioning system including a motor driven compressor and employing the solid state control circuit according to one embodiment of the invention.

FIG. 2 is a detailed schematic diagram of the solid state control circuit shown in FIG. 1.

DESCRIPTION

Figure 3:
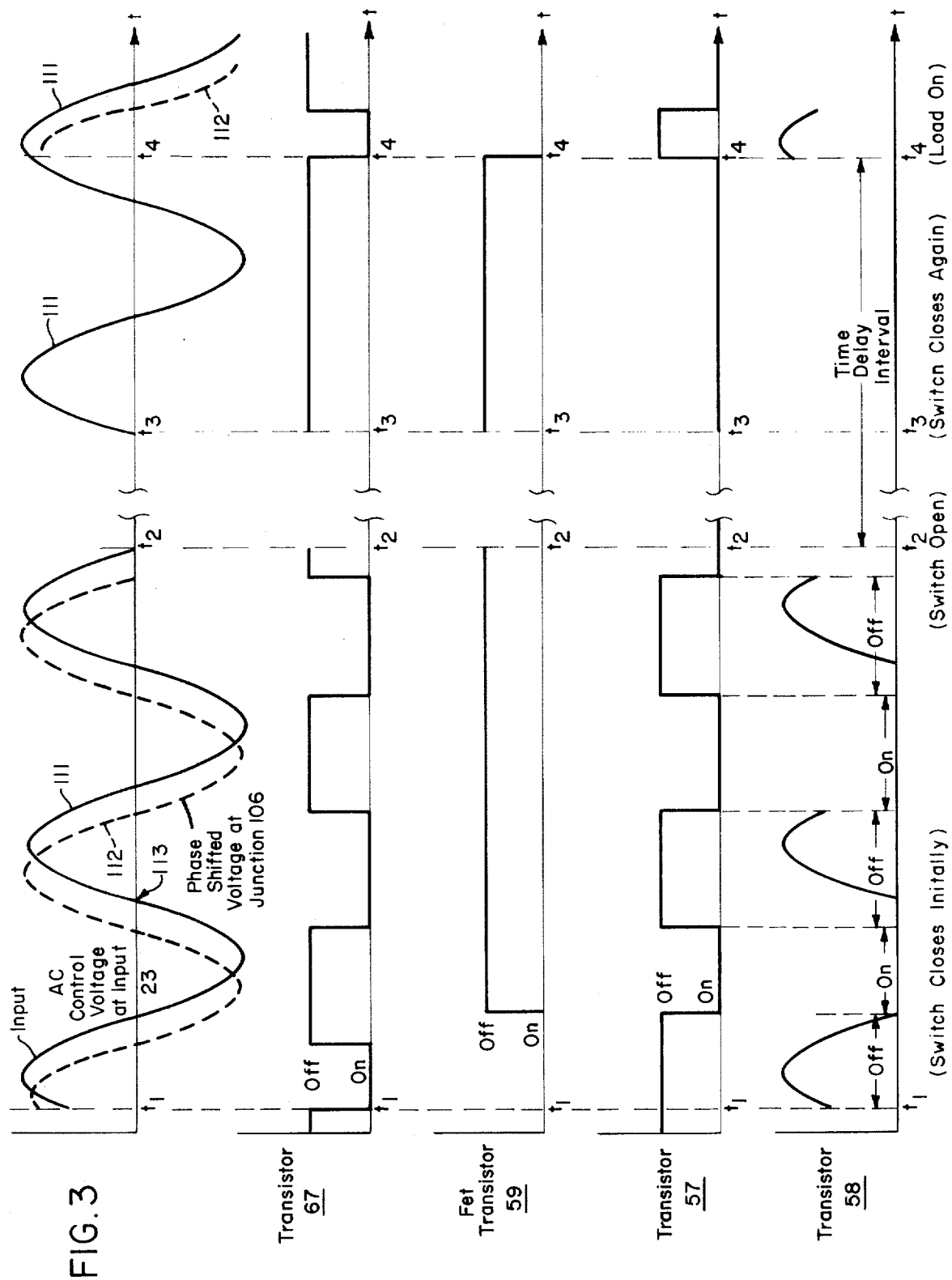
FIG. 3 is a wave form diagram illustrating the electrical characteristics of certain critical components of the circuits shown in FIGS. 1 and 2.

With reference to FIG. 1, the solid state selective delay control circuit 11 may in general be used in any control system in which an electrical load is intermittently energized. The intermittent energization of the load may be purposeful as in the case of the air conditioning system shown in FIG. 1 in which a compressor motor is periodically energized in response to an intermittent control voltage available through a temperature sensitive or thermostat switch 13. On the other hand, the intermittent operation may be caused by abnormal rapid cycling of the thermostat switch, or in general any accidental or occasional momentary loss of electrical power due for example to over-loaded circuits, regional "brown-outs," electrical storms, etc.

Whether the intermittent electrical voltage is intentionally turned on or off or is merely subject to occasional interruption, there are systems in which it is desirable to delay rapid re-energization of the electrical load. As discussed above, in refrigerant or air conditioning systems, such as shown in FIG. 1, it is undesirable to immediately turn on the compressor motor following a brief interruption of electrical power after extended operation thereof has built up the pressure load on the compressor. Although the use of circuit 11 in connection with air conditioning system 14 as shown in FIG. 1 is one particular and preferred application of the present invention, many other uses for the selective delay are contemplated. Some of these have been mentioned above. However, for the purpose of explaining the construction and operation of the invention, reference will be made to the use of circuit 11 in the system of FIG. 1.

Typically in air conditioning systems, the compressor motor 12 operates off of the ac power available from the line voltage indicated at 16. In this case, the ac power for motor 12 is provided through a controlled power or load relay 17 having contacts 18 capable of handling the large current flow required of the compressor motor.

For controlling the air conditioning system 14 by the thermosensitive switch or thermostat 13, it is common to use a low power, low voltage source suitable as a control signal in which large currents and voltages are not required and in fact are undesirable. For this purpose, a step-down transformer 19 may be provided for stepping the relatively high line voltage at 16 down to a lower voltage alternating current control signal such as 24 volts ac. Such a voltage may be easily handled by the relatively sensitive contacts 21 of switch 13, which undergo repeated opening and closing for regulating the temperature of the air conditioning building or other closed environment.

In the absence of solid state delay circuit 11, switch 13 might be connected directly to and for operating relay 17. In such case pressure motor 12 would be turned on and off directly in response to the closing of the opening of contacts 21. For the reasons stated above, this causes undesirable strain on the motor and power circuit and results in a shortened life of the components.

In addition to the principal thermostat switch 13, many air conditioning systems may also include a safety switch 22 which may be connected in the circuit controlling load relay 17 as shown in FIG. 1, for opening the load relay contacts 18 in the event an unsafe operating condition occurs in system 14. For example, safety switch 22 may be another temperature switch responsive to abnormal temperatures within the system or it may be a pressure sensitive switch responsive to the build-up of excess pressures by the compressor. In response to the unsafe condition, switch 22 will open and thus de-energize load relay 17 opening contacts 18 and interrupting the electrical power to motor 12. One of the features of the selective delay circuit 11 is its ability to provide the selective delay not only in response to a switch at the input 23, that is thermostat switch 13, but also in response to a switch disposed at the output 24 of the circuit, in this instance safety switch 22. Thus brief interruption of either the input circuit associated with switch 13 or the output circuit associated with switch 22 will cause circuit 11 to provide the selective delay to prevent immediate re-energization of compressor motor 12 under the aforementioned conditions.

With particular reference to FIG. 2, circuit 11 is in this disclosed embodiment provided by a solid state bi-directionally conducting switching means in the form of a bi-directional thyristor means 31. Thyristor means 31 is here disposed for selectively connecting the source of alternating current control voltage, available at input 23 and extended over lines 32 and 33, to and for selectively energizing an electrical load connected across output 24. As discussed in connection with FIG. 1, the ac control voltage may be intermittently applied through thermosensitive switch 13 while the output electrical load may be a load control relay 17 in which a solenoid coil thereof (not shown) constitutes the load impedance connected across output 24.

Bi-directional thyristor means 31 may be provided by a triggerable bi-directionally conducting thyristor or triac 34 having the electrodes of principal current flow, namely, electrodes 36 and 37 connected in series with the alternating current control voltage and the electrical load as shown. A trigger or control electrode 38, sometimes referred to as the gate electrode is responsive to proper polarity trigger pulses to trigger or switch triac 34 between a high impedance "off" condition and a low impedance "on" condition. In the low impedance "on" condition, triac 34 is capable of passing currents in either direction, i.e., bi-directionally, and thus is advantageously used as in this case for controlled switching of alternating current voltages. The triggering of triac 34 is phase sensitive and this characteristic of the device plays an important role in the operation of the present circuit as more fully discussed herein.

Assuming an initial un-energized condition of the system, triac 34 of switching means 31 is in its "off" state, the alternating current control voltage at input 23 is zero, representing for example an open condition of contacts 21 of switch 13 and thus the output at 24 is un-energized. Now in response to an initial application of the control voltage at input 23, a trigger circuit means 41 serves to immediately trigger or switch triac 34 to its bi-directional "on" condition and thus energize the load at output 24. For this purpose, trigger circuit means 41 is connected between the ac control voltage at input 23, via line 32, and solid state switching circuit means 31 as illustrated. Upon an initial application of the control voltage and assuming the circuit has been in an un-energized condition for an extended interval, then trigger circuit means 41 is immediately responsive to the appearance of the control voltage to switch on the triac.

To achieve the desired selective delay function, other solid state circuitry in addition to the trigger circuit means 41 is provided. More particularly, an electrical delay circuit means 42 is effective to provide a predetermined, and in this instance adjustable delay period under certain operating conditions of the circuit. Namely, delay circuit means 42 includes capacitive storage means for accumulating a stored electrical charge as a result of current flow through triac 34 of the solid state switch. Thus, after a predetermined interval of conduction by triac 34, the accumulated charge on the capacitive storage is available to provide the aforementioned time delay function when called for by the operation of the circuit. In accordance with the general operating principle of circuit 11, this delay function is initiated only upon termination of the conduction through triac 34, because the delay interval in re-energizing the electrical load is to be effective only after and for the predetermined time interval following a loss or interruption of the electrical power or alternating current control voltage. Thus, although electrical delay circuit means 42 accumulates a sufficient charge only after an extended "on" period of triac 34, the actual delay function is not introduced until an interruption of this "on" state.

To inform the delay circuit means that there has been an interruption in the current flow through triac 34, a sensing circuit means 43 is provided. Sensing circuit means 43 in general responds to a continuous state of conduction through triac 34 to continuously provide proper electricl signals for re-triggering the control or trigger electrode 38 of the triac. The bi-directional thyristor or triac 34 is not capable of indefinitely sustaining conduction of an alternating current signal flowing between electrodes 36 and 37, the device must be continuously re-triggered and re-triggering voltage must have a proper polarity phase relative to the phase of the alternating current voltage applied across electrodes 36 and 37. Sensing circuit means 43 together with other circuitry discussed herein serves to provide the necessary electrical signals to trigger circuit 41 for proper re-triggering of the triac so that the electrical load at output 24 remains energized so long as the alternating current control voltage is continuously applied to input 23.

As indicated above, once there is a loss, even if momentary, in the conduction of current through electrodes 36 and 37 of the triac, the sensing circuit means serves to actuate the delay circuit means 42 which is effective to disable the trigger circuit means 41 through the operation of a trigger disablement circuit means 44 and a logic circuit means 46. Disablement circuit means 44 includes in this instance a switching transistor for being switched to a condition which disables the normal electrical functioning of trigger circuit means 41 and prevents the triggering of the triac in response to the re-appearance of the alternating current control voltage at input 23.

Logic circuit means 46 provides the necessary logic determination for operating trigger disablement circuit means 44 only under the combined conditions of the output of the sensing circuit means indicating a loss of current flow through triac 34 and the delay circuit means having stored sufficient charge to establish the delay interval. Thus, logic means 46 discriminates against an initial application of the control voltage at input 23 in situations where circuit 11 and the electrical load have been inactive for a period of time versus the situation in which the control voltage re-appears at input 23 after an extended operating period of the electrical load and an active condition of circuit 11. In the former situation the trigger circuit means is permitted to switch the triac, while in the latter situation the disablement circuit means is activated for the delay interval preventing immediate re-triggering of the triac and immediate re-energization of the load.

Although the foregoing generally describes the operation of the selective delay function, the actual triggering and triggering disablement of the triac is phase sensitive and the various electrical control signals must be carefully phased relative to the applied alternating current control signal. In particular, the trigger disablement circuit means 44 is periodically actuated even during sustained conduction of triac 34; however, the activation thereof occurs at a phase relationship to the applied ac control voltage so as not to disturb the normal re-triggering of the triac by circuit means 41 which occurs during different phase portions of the applied voltage. Furthermore, although circuit means 44 is periodically switched to its activated disabling condition, once the sensing circuit means 43 detects a loss of current flow through the triac 34, the disablement circuit means is thereupon continuously disposed in its activated condition for the duration of the time delay provided by circuit means 42.

These interrelated functions of the various circuit means of circuit 11 may be more fully understood from the following detailed description of the circuit components and their manner of operation. Also, in describing circuit 11, reference will be made to the diagrams of FIG. 3 in which the electrical conditions and phase relationships between the circuit elements are illustrated.

In this particular embodiment of the delay circuit, the intermittently applied alternating current control signal available at input 23 is used both for driving the electrical load at output 24 and to provide a dc voltage for operating circuit means 42, 43, 44 and 46. For this purpose an ac to dc converter is provided by diode 51, filter capacitor 52 and voltage dividing resistors 53 and 54. If for example, circuit 11 is used in the system of FIG. 1, step-down transformer 19 may provide approximately 24 volts ac as the control voltage to input 23. This ac voltage is in turn rectified and stepped down to approximately 12 volts dc at junction 56.

Within logic circuit means 46, transistor 57 acts as a transistor switch initially in the off or non-conducting state and being switched to an "on" or conducting state for supplying base current to a switching transistor 58 of the trigger disablement circuit means 44. Also, within logic circuit means 46 is a field effect transistor 59 having the drain and source electrodes 61 and 62 respectively connecting the base electrode 63 of transistor 57 to line 33 which may be referred to as the circuit ground. A gate electrode 64 of field effect transistor (FET) 59 is connected to a junction 66 of delay circuit means 42 such that FET transistor 59 is responsive to the condition of the delay circuit to assume a high impedance "off" condition between electrodes 61 and 62 after a storage charge builds up in the delay circuit.

Also within logic circuit means 46 is still another transistor 67 having its collector electrode 68 connected through a resistor 69 to drive the base of transistor 57, where the condition of transistor 67 itself is controlled by the condition of sensing circuit means 43 over a line 71. Resistors 72 and 73 are biasing resistors. In this instance, transistors 57 and 67 are NPN junction transistors while FET transistor 59 is an N-type junction FET.

In this instance, the transistors of logic circuit means 46 are connected to form a "Nor" logic gate, in which transistors 59 and 67 form the two input stages to the gate. More particularly, the circuitry is responsive to the input signals from the delay circuit means 42 and the sensing circuit means 43 available at junction 66 and line 71 respectively to control the state of transistor 57 which serves as the output of the logic circuit. As indicated above, this serves to control the condition of the trigger disablement circuit means 44 in response to the combination of conditions of delay circuit means 42 and sensing circuit means 43 to achieve the desired selective delay in re-triggering triac 34. The output of transistor 57 is taken from its emitter electrode 74 and extended over line 76 to the base electrode 77 of transistor 58.

Delay circuit means 42 includes a charge receiving capacitor 81 connected at junction 66 to the base of transistor 59 and in parallel with a variable resistor 82. This forms an RC timing circuit in which a charge is accumulated on capacitor 81 in response to a series of negative polarity pulses applied over a line 83 from the trigger electrode 38 of the triac. Also, within the delay circuit means 42 a unidirectional conducting means in the form of diode 84 is provided to block any positive voltage on line 83 from reaching the storage capacitor 81 of the RC timing circuit. Resistors 86 and 87 serve as a voltage divider in this instance for dropping the voltage on line 83 to a relatively lower level available at junction 88 for charging capacitor 81 through diode 84. Trigger circuit means 41 is provided in part in this instance by a resistor 91, a unidirectional conducting means in the form of diode 92 and a control electrode or gate resistor 93 which together serve as a forward trigger circuit path for triggering electrode 38 during the positive polarity cycle of the alternating control voltage on line 32.

To provide triggering for the negative ac cycle, a phase shifting network is provided including resistor 94, capacitor 96 and a further resistor 97, with unidirectional conducting means in the form of diodes 98 and 99 serving to channel the proper polarity of currents to and from the phase shifting network.

As indicated above, trigger disablement circuit means 44 is provided in this instance by a transistor 58 which has its emitter collector path connected between junction 91 with diode 92 and line 33. A unidirectional conducting means in the form of diode 101 is connected between resistor 91 and transistor 58 to block any negative voltages which might otherwise be applied to the collector electrode of transistor 58.

Sensing circuit means 43 includes a unidirectional conducting means in the form of diode 102 and a pair of voltage dividing resistors 103 and 104 for applying a base bias voltage to transistor 67 of logic circuit 46 over line 71 as a function of the variable voltage available at junction 106 of trigger circuit means 41. In particular, a positive base bias voltage is applied over line 71 to turn transistor 67 to an "on" condition during phase shifted, positive cycles of the alternating current flowing triac 34.

Considering now the operation of the various circuit elements described above, initially it was assumed that the circuit is in an inactive condition with no voltage applied at input 23 and with the electrical load at output 24 un-energized. Accordingly in this state, all capacitors are discharged and the delay circuit 42 including the RC timing network is inactive.

Now it is assumed that the alternating current control voltage is applied to input 23, such as in response to a thermal condition causing closure of contacts 21 of temperature sensitive switch 13. This applied ac voltage is rectified, filtered and stepped down by diode 51, capacitor 52, resistors 53 and 54 to provide a relatively low direct current voltage at junction 56.

Initially FET switching transistor 59 assumes a low impedance "on" condition pulling the base electrode 63 of transistor 57 to near ground or reference potential at line 33 and thus turning transistor 57 "off." This in turn maintains transistor 58 of the trigger disablement circuit means 44 in its "off" state. These electrical conditions are illustrated by the voltage wave forms shown in FIG. 3, indicating the relative on and off voltage states of each of the various transistors at a time $t_1$ when the ac control voltage is first applied to input 23. In these diagrams the vertical scale represents the voltage at the collector electrodes (the drain electrode in the case of transistor 59) of the various transistors, while the horizontal axis represents the time base. The phase relationship between these various wave forms and the ac control voltage at input 23 and a phase shifted voltage at junction 106 are indicated by the wave forms 111 and 112 respectively drawn to the same time base in FIG. 3.

With trigger disablement circuit means 44 in its unactivated condition as represented by the "off" state of transistor 58, the first positive cycle of the ac control voltage applied to trigger circuit means 41 and to electrode 36 of triac 34 causes the triac to be switched or triggered to its "on" conducting state. In particular, the positive cycle of the wave form as shown in FIG. 3 generates a positive current flow through resistor 91, diode 92 and resistor 93 to the trigger electrode 38 of triac 34. With the electrode 36 of the triac also being driven positive at this time by the same dc control signal, the proper triggering condition for the triac is established and it begins to conduct through electrodes 36 and 37 energizing any load impedance connected at output 24.

Furthermore, as current begins to flow through the traic during the positive cycle of the ac wave form, a portion of this current flow is passed through diode 99, resistor 94, capacitor 96 and resistor 97 so as to cause capacitor 96 to assume a positive charge. The capacitor 96 retains this positive charge when the applied ac control voltage on line 32 crosses zero and becomes negative. As a consequence, the positive voltage retained by capacitor 96 which is in effect a phase shifted ac voltage, is applied through diode 98 and resistor 93 to maintain electrode 38 positive during the negative going crossing of the applied ac voltage. These conditions meet the necessary triggering specifications for the triac and maintain the triac in its low impedance "on" state for the full cycle of applied alternating current.

So long as transistor 58 of the trigger disablement circuit means 44 is maintained in its high impedance "off" state, the triac will be repetitively triggered on in the above manner in response to each positive going cycle of the applied ac control voltage. If the ac control voltage is applied at input 23 at a time during its negative cycle, then triac 34 will not be triggered on until the applied ac signal passes into the positive portion of its cycle. There may be a very small delay, for example on the order of a few milliseconds, before triac 34 is initially triggered on depending upon the timing of the applied ac signal.

While it is necessary to dispose transistor 58 in the "off" state prior to the positive going crossing of the applied ac wave form, this transistor serves in this embodiment as the means for selectively disabling trigger circuit means 41. As discussed herein, it will be seen that the transistor 58 is used to prevent re-triggering of triac 34 by maintaining the transistor 58 in its "on" state under certain conditions. However, for the steady state continuous conduction of triac 34 it will be observed in the wave form diagrams of FIG. 3 that transistor 58 is always switched to its off position at a time slightly prior to the positive going cycle of the ac control voltage to insure proper re-triggering of the triac. This operation is insured by the phase shifting characteristics of the circuit including resistors 94 and 97, and capacitor 96, where the phase shifted ac signal available at junction 106 appears in wave form diagram of FIG. 3 as being slightly in advance of the ac control voltage. This causes the positive base bias voltage applied to the base transistor 67 through sensing the circuit means 43 to occur slightly in advance each time of the positive going crossing 113 of the control voltage represented by wave form 111 in FIG. 3.

Concurrently, after the conduction through triac 34 of solid state switching means 31 begins, the gate electrode 38 is periodically driven negative by the ac control voltage. Although electrode 38 is maintained to positive during the first part of the negative ac cycle, the latter portion of the negative cycle forces the electrode 38 negative and this periodic negative voltage is employed to charge the storage capacitor 81 of delay circuit means 42. In particular, each time electrode 38 becomes negative, a negative voltage pulse is conducted through resistor 93, diode 98, and over line 83 to delay circuit means 42. From here the voltage is divided by resistors 86 and 87 to a lower value at junction 88 and applied through diode 84 to and for charging the capacitor with a minus to plus polarity as indicated in FIG. 2. After a brief interval of conduction of triac 34, there have been a series of negative polarity pulses applied to capacitor 81 and it assumes a charge in which gate electrode 64 becomes negative relative to source electrode 62 of FET transistor 59. With the gate electrode being negative relative to the source electrode, transistor 59 is driven to an "off" state in which a high impedance condition is provided between the drain and source electrodes 61 and 62 respectively.

In this manner, the delay circuit means 42 has been charged by an interval of sustained conduction of triac 34, and the initially "on" low impedance state of FET transistor 59 has been converted to an "off" high impedance state. Transistor 59 remains in this "off" state so long as conduction through triac 34 continues and for an interval of time thereafter determined by the time constant characteristic of delay circuit means 42.

With transistor 59 in the "off" state, the base electrode 63 of transistor 57 may be controlled by the output of transistor 67. Accordingly transistor 57 and trigger disablement circuit means 44 are turned on and off in accordance with the state of transistor 67, representing one of the inputs of the aforementioned "Nor" gate function of logic circuit means 46. The operation of transistor 57 whereby it is turned on as FET transistor 59 goes to the off condition and where thereafter transistor 57 is turned off and on periodically, is illustrated in the wave form diagrams of FIG. 3.

In this manner, FET transistor 59 representing the other input of the "Nor" logic gate is initially "on" to insure that transistor 58 of disablement circuit means 44 is unactuated or "off" for proper triggering triac 34 in response to the positive going ac control voltage. Furthermore, the phase shifted "on-off" operation of transistor 67, the other input of the "Nor" logic maintains the transistor 58 in the "off" state when the gate to source bias of transistor 59 goes negative and reverse biases the FET transistor to its "off" state.

Thus after an initial cycle of the applied ac control voltage, the circuit conditions can be summarized in the following manner. Triac 34 of solid state switching means 31 is bi-directionally conducting the alternating current voltage and thus energizing the load at output 24. FET transistor 59 is "off" due to the reverse bias applied to the gate-source electrodes by means of capacitor 81 of delay circuit means 42. Transistor 67 is periodically, briefly turned "on" prior to each positive going zero crossing of the applied ac voltage, represented by wave form 111 of FIG. 3, and each time this occurs transistor 58 of circuit means 44 is turned "off" to enable positive triggering of electrode 38.

It is observed that unless transistors 57 and 58 are turned "off" prior to each positive going crossing 113 of wave form 111, then an unpredictable condition will occur in the circuit in which the signal for turning off transistor 58 is in a race with the positive going ac trigger signal for switching on triac 34. In such case, it is unpredictable whether triac 34 will be switched "on" and the circuit may not operate reliably.

Assume that the ac control voltage has been applied for an extended period of time. For example, this may correspond to the condition in which the compressor motor has been operating for a number of minutes and a high pressure, heavy load condition has developed in the compressor. At this time there is a momentary interruption in the ac control voltage at input 23 of circuit 11, representing for example a momentary opening and closing of contacts 22 of switch 13.

The moment this occurs, the current flow through triac 34 decays to zero and drops out of conduction. The electrical load becomes unenergized. The voltage across capacitor 96 starts discharging and transistor 67 if on is immediately turned "off" by loss of the biasing voltage over line 71 from sensing circuit means 43.

Transistor 59 remains "off" due to the reverse bias voltage applied through storage capacitor 81 of the time delay circuit 42, and accordingly with both transistor 59 and transistor 67 "off" this results in the output of the "Nor" logic gate to turn on and activate trigger disablement circuit means 44. Thus transistor 58 assumes its "on" low impedance condition and remains in such condition.

These operating characteristics of circuit 11 are illustrated in FIG. 3 where the time $t_2$ represents an opening of switch 13 or some other interruption in the applied ac control voltage at input 23. As indicated, if the ac control voltage is re-applied at a time $t_3$ shortly after the loss of voltage at $t_2$, then the time delay function provided by circuit means 42 maintains transistor 58 in its "on" low impedance state and thus prevents re-triggering of the triac. It is noted that so long as transistor 58 is "on" any positive voltage appearing at the junction of resistor 91 and diode 92 is essentially shorted to ground at reference line 33. This prevents any positive voltage pulse from passing through diode 92 and resistor 93 to trigger control electrode 38 of triac 34.

Depending upon the circuit parameters, there is a minimum time interval between $t_2$ and $t_3$ which must elapse before the circuit will "lock out," that is assume the unenergized state for the delay interval. If the time between $t_2$ and $t_3$ is so short that is is within the "reset time" of the circuit, determined by the rate of load current decaying below the holding current level of triac 34 and also determined by the discharge rate of capacitor 96 then the circuit may merely overlook the interruption and continue in the latched "on" condition. Normally this "reset time" is extremely small such as on the order of microseconds or milliseconds.

In most cases the interruption or time span between $t_2$ and $t_3$ will be long enough to exceed the "reset time." Thus assuming that the ac control voltage represented by wave form 111 in FIG. 3 is reapplied at a time $t_3$ after the "reset time" of the circuit, then as indicated the transistor 58 will be maintained on for the delay period in response to the combined off conditions of transistors 59 and 67. After the pre-determined time delay has elapsed, then at a time $t_4$, field effect transistor 59 becomes forward biased again because of the loss of negative charge on capacitor 81, and consequently transistor 58 of the trigger circuit disablement means is turned "off" enabling re-triggering of the triac. This operation is illustrated by the various wave forms in FIG. 3. If on the other hand, the control voltage is not applied until after the expiration of the delay interval, then the triac would be immediately triggered on in accordance with the operation described above.

Any subsequent opening or closing such as by reason of contact bounce during the delay interval between $t_2$ and $t_4$ as shown in FIG. 3 will not affect the unenergized condition of the circuit at output 24. Thus the electrical load is isolated from any rapid cycling or contact bounce of temperature sensitive switch 13.

The delay interval will last until capacitor 81 discharges through variable resistor 82. When sufficient charge has drained off of capacitor 81, field effect transistor 59 reverts to the "on" condition enabling the circuit to respond to another operating cycle. By adjusting variable resistance 82, the duration of the time-out or time-delay may be varied to suit the particular application. This adjustment may be advantageously provided by a screw adjustment on the chassis for circuit 11, or by a knob or any other convenient and manually accessible adjustment.

One of the advantageous features of circuit 11 is that it is responsive to an interruption of the current at not only the input 23 but also at the output 24. The significance of this is best illustrated in connection with FIG. 1, in which as illustrated air conditioning systems and analagous systems many times employ a safety switch 22 adapted to be connected in series with the electrical load, in this instance a load control relay 17. Should an unsafe condition occur causing a momentary opening of safety switch 22, circuit 11 is equally responsive to this occurrence to provide the same selective delay function as in the case of a brief opening of the temperature sensitive switch 13. More particularly, it will be observed that the opening of switch 22 causes an interruption in the current flow through triac 34 as in the case of the opening of contacts 21 of switch 13. The various circuit means 41, 42, 43, 44 and 46 function in this case in the same manner as described above to prevent immediate re-energization of the output load if there is a brief opening of switch 22.

Figure 4:
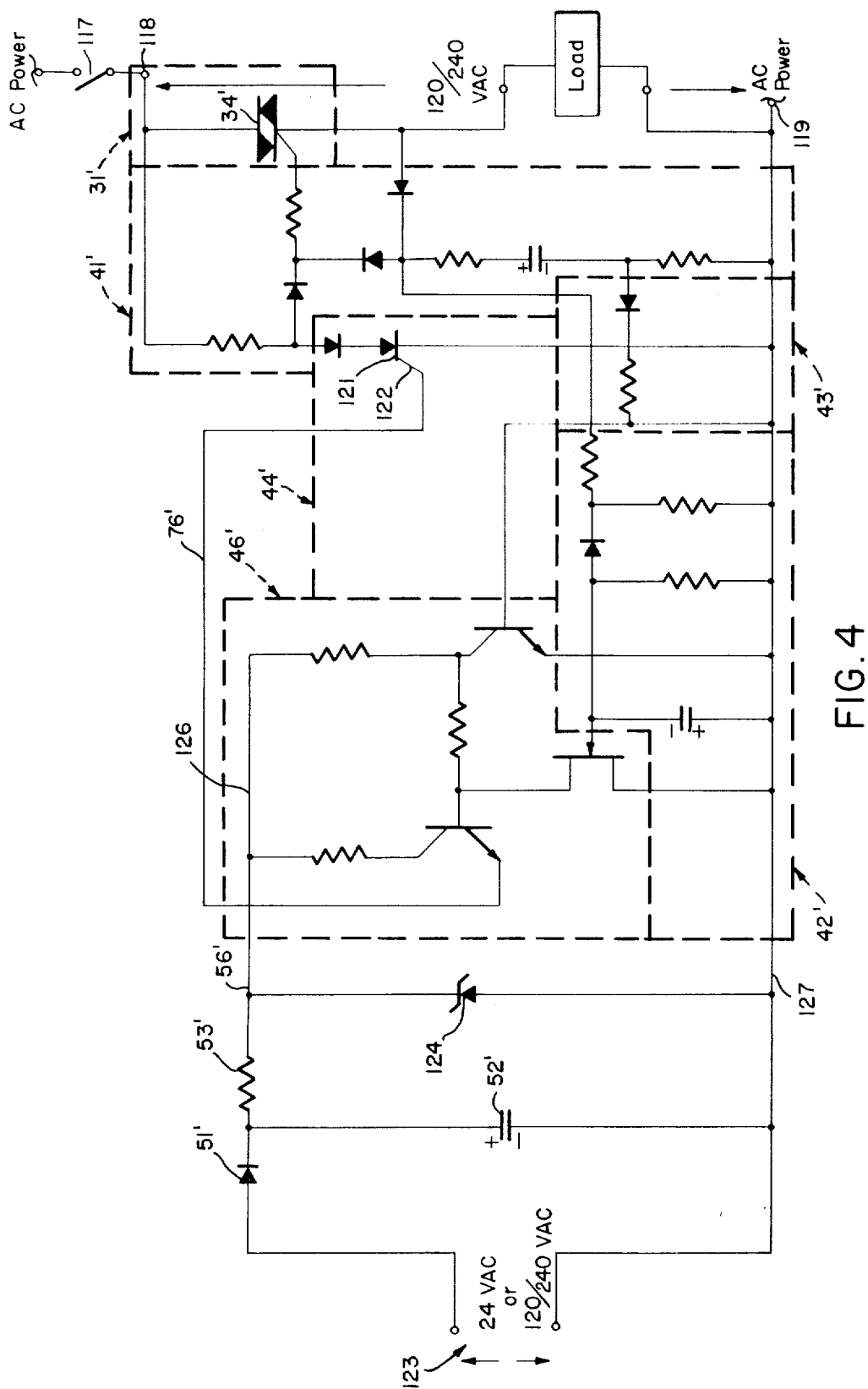
FIG. 4 is a detailed schematic diagram of an alternative embodiment of the solid state control circuit adapted for direct control of the compressor motor current.

With reference to FIG. 4, an alternative embodiment of the invention is illustrated. In this instance a solid state selective delay circuit is provided with a triac 34' of switching circuit means 31' capable of directly switching the large load currents associated with a compressor motor or any other large current device. Thus unlike FIG. 1, the load 116 in FIG. 4 is representative of a heavy current electrical device or applicance such as compressor motor 12 of FIG. 1 in which a control switch 117 applies 120 or 240 line voltage across terminals 118 and 119 for energizing load 116. Switch 117 may for example be a thermostat switch, contacts of a power relay, a manually thrown switch or any other type of control switch.

To provide the same selective delay function in this case as in circuit 11 of FIG. 2, trigger circuit means 41', delay circuit means 42', sensing circuit mens 43', trigger disablement circuit means 44' and logic circuit means 46' are provided. However there are some modifications to the circuitry to accommodate the different applications.

In disablement circuit means 41', transistor 58 has been replaced by a semi-conductor controlled rectifier (SCR) 121 to handle the higher ac voltages applied across the triac switching circuit. Whereas in FIG. 2, the ac control voltage had been stepped down to approximately 24 volts, the circuit shown in FIG. 4 may accommodate the application of 120 or 240 ac line voltage directly across terminals 118 and 119. SCR 121 having a control electrode 122 connected over line 76' to logic circuit means 46' serves to control the "on-off" condition of the SCR instead of the base electrode of transistor 58.

A further modification of the circuit is to provide a suitably low direct current voltage at junction 56' without requiring the step down transformer 19 used in the system of FIG. 1. In this instance, terminals 123 may be connected to any available line voltage such as 120 or 240 volts ac, or if desired the step down 24 volts ac may be used. If the higher voltage range is employed, a zener diode 124 is used to step the voltage down at junction 56' to a suitably low level, rather than the straight voltage divider network of resistors 53 and 54 of circuit 11 in FIG. 2. Zener diode 124 more efficiently provides the large voltage drop required from such high voltages as 120 or 240 volts ac. The rectification and filtering circuit including diode 51' and capacitor 52' should have in this instance voltage capabilities which will tolerate the direct application of the 120 or 240 line voltage.

The ac line voltage applied to terminals 123 may or may not be the same ac power voltage applied to terminals 118 and 119. In most cases the same line voltage may be used; however, this is not a requirement for proper operation of the circuit. In fact, the dc voltage applied across lines 126 and 127 may be developed by any suitable means and need not depend upon or have any relationship to the ac power applied across the thyristor switching means at terminals 118 and 119. In this regard, the circuit of FIG. 4, unlike circuit 11 of FIG. 2, provides for supplying a direct current voltage between lines 126 and 127 for certain of the solid state components which is independent of the intermittent ac control voltage applied across the thyristor switching means 31'.

While only a limited number of embodiments of the present invention have been disclosed herein, it will be readily apparent to persons skilled in the art that numerous changes and modifications may be made thereto without departing from the spirit of the invention.

For example, it is contemplated that additional and essentially independently operating delay circuit means may be provided in combination with the solid state selective delay circuit such as the illustrated circuit 11 in FIGS. 1 and 2. It may be desirable in this regard to provide a fixed, brief delay in series with circuit 11 for delaying the energization of the load even upon an initial application of the control voltage through switch 13. Such a delay could be positioned either before or after circuit 11 within the system shown in FIG. 1 and the delay function provided thereby would be essentially independent of the selective delay feature of circuit 11. For example, such an additional delay may be provided to prevent the sudden surge of power in a plant or building when there is a return of line voltage after a loss of power and all of the previously turned-on equipment and lighting within the building overloads the circuits. By providing the heavier current equipment with a brief fixed delay, each delay being different for each piece of equipment, this sudden power surge is avoided. Such a fixed delay if used in combination with circuit 11 would typically be of a much shorter delay period than the selective delay provided by delay circuit means 42 and described above.

In this light it will be readily appreciated that the foregoing disclosure and description hereof are for illustrative purposes only and do not in any way limit the invention which is defined only by the following claims.

I claim:

1. In a control system for energizing an electrical load in response to a source of intermittently applied alternating current control voltage, comprising:
   a solid state bi-directionally conducting switching means for selectively connecting said source of control voltage to and for energizing said electrical load;
   trigger circuit means connected between said source of control voltage and said solid state switching means to repetitively trigger said switching means by said control voltage to its bi-directionally conducting state for energizing said load;
   electrical delay circuit means connected to said switching means and being effective after a predetermined interval of said conduction to provide a time delay period initiated upon termination of said switching means conduction;
   sensing circuit means connected to said switching means for detecting termination of said conduction;
   trigger disablement circuit means connected to and for selectively disabling said trigger circuit means to prevent triggering of said switching means by said control voltage; and
   logic circuit means connected and responsive to said delay circuit means and said sensing circuit means and being connected to and for operating said trigger disablement circuit means in response to the detected termination of said switching means conduction and for the duration of said time delay period defined by said delay circuit means, whereby said electrical load is substantially immediately energized in response to an initial application of said source of control voltage whereas the load will not be immediately re-energized until after the expiration of said delay period in the event of a brief loss of said source of control voltage.

2. In the control system of claim 1, said solid state switching means comprising a bi-directionally conducting thyristor means and said trigger circuit means including a phase shifting network for initially and thereafter repetitively applying electrical trigger signals to said thyristor means in response to an initial and thereafter continuous application of said source of alternating current control voltage.

3. In the control system of claim 2, said thyristor means including a trigger or control electrode for receiving said electrical triggering signals, and said trigger circuit means including a first triggering circuit path connected between said source of control voltage and said control electrode and a second triggering circuit path connected between said phase shifting network and said control electrode for triggering said thyristor means to its conducting state as said control voltage crosses zero toward either positive or negative polarity.

4. In the control system of claim 1, said trigger disablement circuit means having an unactuated state in which said trigger circuit means is enabled and an actuated state in which said trigger circuit means is disabled, said trigger circuit disablement means being responsive to said logic circuit means to assume said actuated state in response to said delay circuit means being enabled to provide said delay period and in response to said sensing circuit means detecting a loss of conduction through said switching means.

5. In the control system of claim 4, said logic circuit means having first and second inputs provided by first and second transistors each having "on" and "off" conditions, said first transistor being connected to and responsive to said delay circuit means and having an initially "on" condition and thereafter assuming its "off" condition in response to said delay circuit means being enabled and said first transistor remaining in said "off" condition during said conducting state of said switching means and for the duration of said time delay period following termination of said conducting state, said second transistor being connected and responsive to said sensing circuit means to assume its "off" condition in response to said sensing circuit means detecting termination of said conducting state, and said logic circuit means providing a "NOR" logic function in response to the combined conditions of said first and second transistors such that said trigger circuit disablement means is driven to its actuated state in response to said first and second transistors both being in their "off" conditions.

6. In the control system of claim 5, said trigger circuit means including a phase shift network for applying triggering signals to said solid state switching means for sustained conduction thereof during continuous application of said source of control voltage, said sensing circuit means being connected to said phase shift network of said trigger circuit means and being alternately driven thereby by phase shifted alternating cycles of said applied control voltage, said second transistor of said logic circuit means being switched bewteen its "on" and "off" conditions in response to said alternately driven sensing circuit means during continuous conduction of said switching means, and said trigger circuit disablement means being responsive to said logic circuit means to be periodically driven to its actuated state for a portion of the alternating current cycles of the control voltage, the phase relationship between the alternating driven sensing circuit means and the alternating current control voltage being such that the trigger disablement circuit means is returned each time to its unactuated state thus enabling said trigger circuit means during a critical trigger time associated with the solid state switching means, whereas said sensing circuit means being responsive to termination of conduction through said solid state switching means to drive said trigger disablement circuit means through said logic circuit means to its actuated state for disablement of the trigger circuit means during the delay interval.

7. In the control system of claim 1, said trigger circuit means including first and second trigger circuit paths for triggering said solid state switching means into conduction for either polarity of the applied alternating current control voltage, said second trigger circuit path connected to a phase shift network for applying a trigger signal to said solid state switching means as the waveform of the control voltage crosses zero, and said trigger disablement circuit means comprising a solid state switching device connected to and for disabling one of said trigger circuit paths.

8. In the control system of claim 7, said sensing circuit means providing one of the inputs for said logic circuit means and being connected to the phase shift network of said trigger circuit means to cause the output of said logic circuit means to dispose the trigger disablement circuit means in its unactuated state prior to each cycle of triggering of said bi-directionally conducting switching means through said first trigger circuit path so long as said alternating current control voltage is continuously applied, whereby the operation of the sensing circuit means is phase shifted relative to the applied ac control voltage for properly phased operation of the trigger disablement circuit means during sustained conduction of said solid state switching means.

9. In the control system of claim 1, said electrical delay circuit means including a capacitive storage device connected to accumulate a charge thereon during sustained bi-directional conduction of said switching means, a uni-directional conducting device connected between said switching means and said capacitive storage device for charging said capacitive device with currents of one polarity in response to bi-directional current conduction through said switching means, and a resistive device connected to said capacitive device for discharging said storage charge on said capacitive device following termination of conduction through said switching means to provide said delay period of said delay circuit means.

10. A solid state selective time delay control circuit having an input and an output for connection between a control switch which is intermittently operated to apply an alternating current control voltage to the input of said circuit and a controlled electrical load which is connected at the output of said circuit to selectively receive said control voltage and be energize thereby, said circuit comprising:

a solid state bi-directionally conducting switch means for selectively connecting said control voltage to and for energizing said electrical load;

trigger circuit means connected between said source of control voltage and said solid state switching means to repetitively trigger said switching means by said control voltage to its bi-directionally conducting state and to thus energize said load;

electrical delay circuit means connected to said switching means and being effective after a predetermined interval of said conduction to provide a time delay period initiated only after termination of said switching means;

sensing circuit means connected to said switching means for detecting termination of said conduction thereby;

trigger disablement circuit means connected to said trigger circuit means for selectively disabling said trigger circuit means and preventing triggering of said switching means by said control voltage;

logic circuit means connecting said delay circuit means and said sensing circuit means to and for operating said trigger disablement circuit means to disable said triggering of said switching means in response to termination of said conduction and for the time delay period defined by said delay circuit means, whereby said electrical load which may for example be a compressor motor in an air-conditioning system is immediately energized in response to an initial application of said control voltage to the input of said solid state circuit whereas a subsequent brief interruption of the control voltage at the input to said circuit means will not cause reenergization of the compressor motor until after said delay period has expired.

* * * * *